(12) United States Patent
Lam et al.

(10) Patent No.: US 8,290,889 B2
(45) Date of Patent: Oct. 16, 2012

(54) IDENTIFICATION OF RELEVANT METRICS

(75) Inventors: Thanh V. Lam, Poughkeepsie, NY (US); Giampaolo Lauria, Wappingers Falls, NY (US); Anthony F. Pioli, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/616,106

(22) Filed: Dec. 26, 2006

(65) Prior Publication Data

US 2008/0154831 A1 Jun. 26, 2008

(51) Int. Cl.
*G06N 5/02* (2006.01)

(52) U.S. Cl. .................................................. 706/47
(58) Field of Classification Search ............... 706/47
See application file for complete search history.

(56) References Cited

OTHER PUBLICATIONS

Phil Hollows ("All about correlation" 2004).*
Arend et al ("TEC 3.9 State Correlation Engine How to prevent TEC from being flooded" Apr. 2006).*
IEEE dictionary p. 1113 only.*
Pouget et al ("White Paper: Alert Correlation: Review of the State of the Art" Nov. 2003).*
Matthew Caldwell ("The Importance of Event Correlation for Effective Security Management" Information Systems Control Journal, vol. 6, 2002).*
Biazetti et al ("Achieving complex event processing with Active Correlation Technology" Nov. 2005).*
Chen et al ("Complex Event Processing using Simple Rule-based Event Correlation Engines for Business Performance Management" Jul. 2006).*

* cited by examiner

*Primary Examiner* — Lut Wong
(74) *Attorney, Agent, or Firm* — Jon A. Gibbons; Fleit Gibbons Gutman Bongini & Bianco PL

(57) ABSTRACT

A system and method for performing event analysis includes a plurality of logical components (102, 106, 110, 114, 118), each communicatively coupled to at least one other of the plurality of components. A transformer (114) receives from one or more of the logical components, one or more status messages describing a system state to form received status messages and transforms the received status messages into at least one transformed message such that the transformed message has at least one new substring which is not common with the received status messages. A processor (204) is coupled to the transformer (114) that receives one or more rules (104, 108, 112, 116, 120) and applies the one or more rules (104, 108, 112, 116, 120) to the one or more transformed status messages and an output (224) outputs at least one of a new rule and a new event.

14 Claims, 2 Drawing Sheets

IDENTIFICATION OF RELEVANT METRICS

FIELD OF THE INVENTION

The present invention relates generally to service level agreements, and, in particular, to identifying and removing redundant metrics.

BACKGROUND OF THE INVENTION

In large distributed computing environments, vast numbers of events can occur and originate from different sources or applications at the same time. If a user, administrator, or auditor wishes to extract meaning from the large incoming stream of events, a great deal of manual analysis is typically required.

As systems grow larger in number of components and applications, the sheer number of events can overload the users, administrators, and/or auditors. Additionally, as systems grow more complex, and subsystems more interdependent in error reporting, correlation of events in general and errors specifically becomes more of a burden. This is compounded even further as the overall environment scales up. More importantly, massive errors coming from many different parallel jobs are impossible to track and debug.

Therefore a need exists to overcome the problems with the prior art as discussed above.

SUMMARY OF THE INVENTION

A system, method, and computer program product for performing event analysis is disclosed. Embodiments of the present invention include a plurality of logical components each communicatively coupled to at least one other of the plurality of components. A transformer receives from one or more of the logical components, one or more status messages describing a system state to form received status messages and transforms the received status messages into at least one transformed message such that the transformed message has at least one new substring which is not common with the received status messages. A processor coupled to the transformer receives one or more rules and applies the one or more rules to the one or more transformed status messages and an output outputs a new rule and/or a new event.

In accordance with another feature of the invention, the output feeds the new rule and/or the new event to at least one upstream logical component.

In accordance with yet another feature of the present invention, a comparator compares the received status messages to the output and sends a signal to the processor to stop outputting to the at least one upstream logical component if the received status messages match the output.

In accordance with a further feature, an embodiment of the present invention includes a filter located in a one of the plurality of logical components and is located upstream from the transformer and further includes a input coupled to the filter, where the input is for receiving at least two status messages describing a system state where at least one of the at least two status messages is the received message. The filter performs a filtering function so that at least one of the status messages is blocked.

In accordance with one additional feature, an embodiment of the present invention includes an input on a one of the plurality of logical components located in the system upstream from the transformer, where the input is used for receiving at least two status messages describing a system state where at least one of the at least two status messages is the received status message. A processor is located in the logical component having the input, the processor is used for converting the at least two status messages into one or more discrete event sets.

In accordance with another feature, an embodiment of the present invention includes an input on a one of the plurality of logical components located in the system upstream from the transformer, where the input is for receiving at least two status messages describing a system state where at least one of the at least two status messages is the received status messages. In addition, a addition, a processor is located in the logical component having the input, where the processor is for grouping each of the at least two status messages into one or more categories.

In accordance with a further feature of the present invention, each category is a different type of status message received and is based upon a substring within the status messages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
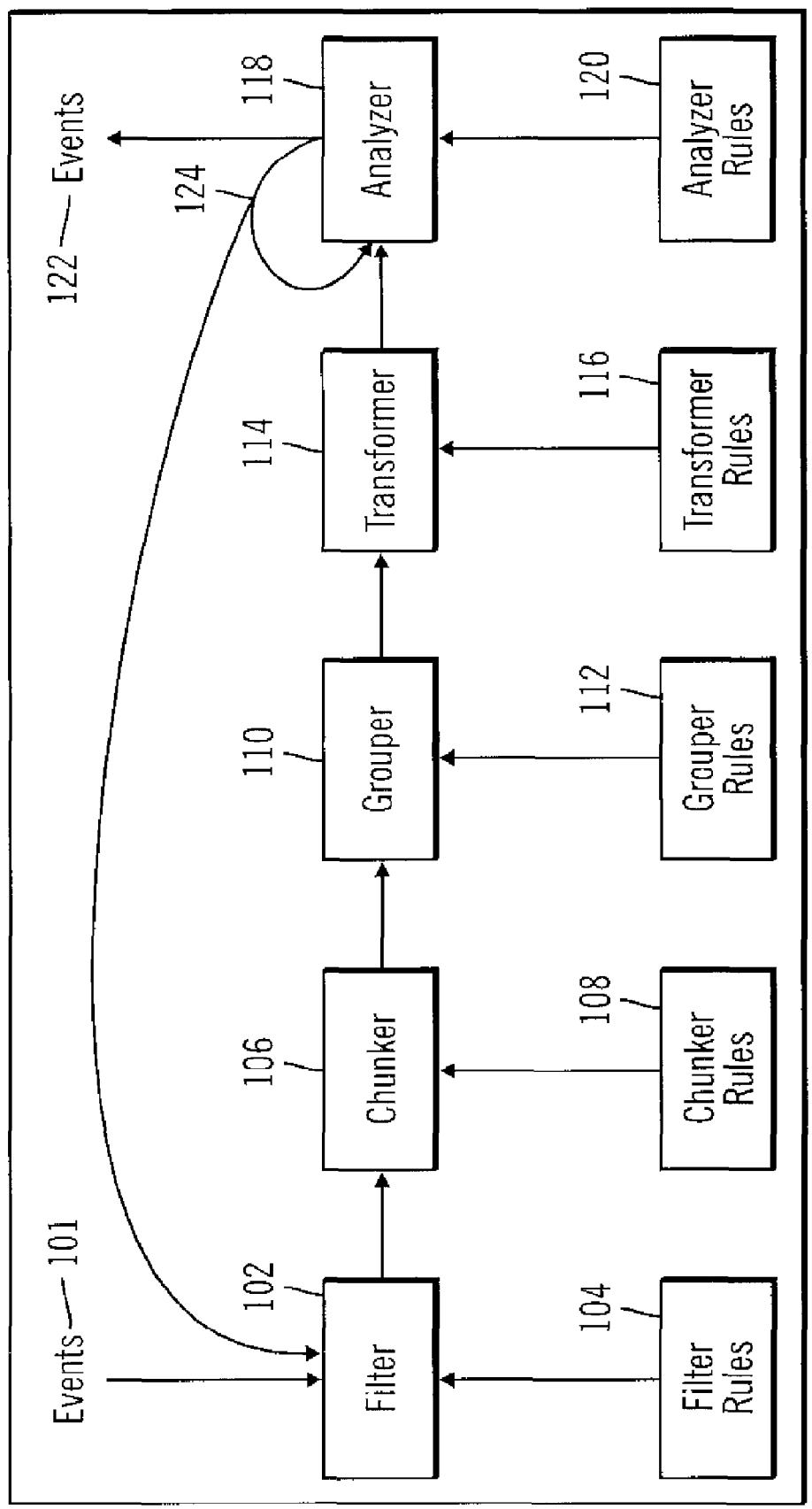
FIG. 1 is a flow diagram showing an event flow with rule sets in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

Described now is an exemplary method and hardware platform for paring down a plurality of events to a defined set of events of interest and then performing automatic correlation functions on the set of events. These events in general, and errors specifically, are automatically analyzed and in some cases transformed into more meaningful events. Alternatively, certain events may be discarded by the system. For example, if the system has events that indicate the network is down, it can ignore events about being unable to access remotely mounted file systems since these types of events are a natural result of the out of service network condition. The automated system according to embodiments of the present invention also helps isolate and chase down errors from different sources in multiple job instances of a parallel application or different applications.

The term "event", as used herein, means any status messages describing a system state, such as a message about an occurrence in the computing environment. Examples are "failed login on node 1" or "can not access/var on node 7". The events do not need to be simple text and can actually be in any form. In certain embodiments of the present invention, it is assumed that all events available to the system are received, though they may not be included in the processing. These choices can be user/operator/administrator selected, or automatically filtered out. An example of events that may not be worth including are when the kernel does an exec( ) call. The reason for this is that such a call is so ubiquitous, it is most likely innocuous. However, some calls to exec( ) may be of interest, for example, exec( ) on a specific file, and these can be included in the rule sets to be processed. The present invention does not necessarily pertain to how the events are input into the system.

FIG. 1 is a flow diagram showing an event flow with rule sets in accordance with an embodiment of the present invention. FIG. 1 shows a plurality of logical components, with include a Filter 102, with a set of Filter Rules 104, a Chunker 106, with a set of Chunker Rules 108, a Grouper 110, with a set of Grouper rules 112, a Transformer 114, with a set of Transformer Rules 116, and an Analyzer 118, with a set of Analyzer Rules 120. The flow has as an input, a relatively large set of events 101 and, as a result of the inventive process and system components, outputs a pared down set of events 122. The elements 102-120 of the system will now be described in greater detail.

The Filter 102 receives a continual stream-i of events that are generated in the computing environment and works to "pluck out" events of interest by applying the set of Filter rules 104 to the incoming event stream. The rules 104 determine what events pass through the Filter 102 and what events are blocked. For example, the following is an excerpt from a sample machine flow through the Filter.

```
- Filter --------------------------------
Rule:
Connection time is
Failed login for
Output:
   11:00:01 Connection time is 10 sec to host node 1
   11:10:30 Connection time is 100 sec to host node 1
   11:25:00 Connection time is 8 sec to host node 2
   12:25:00 Connection time is 1000 sec to host node 1
   01:02:00 Connection time is 25 sec to host node 3
   12:45:15 Failed login for root on node 5 from IP 17.18.19.20
   12:45:25 Failed login for root on node 5 from IP 17.18.19.20
   12:45:35 Failed login for admin on node 6 from IP 17.18.19.21
   12:45:45 Failed login for admin on node 6 from IP 17.18.19.21
   12:45:55 Failed login for wheel on node 7 from IP 17.18.19.22
   12:46:05 Failed login for wheel on node 7 from IP 17.18.19.22
```

Two rules are defined at the beginning of the flow, under the heading "Rule". The rules dictate the only types of events that are allowed to pass through the Filter 102. In one embodiment, the default rule is nothing passes through unless there are matches on one or more expressions.

The next section is the "Output" section. It is easily seen that the Filter followed the rules and only output events that are labeled as "Connection time is" and "Failed login for." It is also interesting to note that several messages are duplicate messages. The output of the Filter is then input to the Chunker 106.

The Chunker 106 receives the stream of filtered events output from the Filter 102 and converts them to sets of discrete events by applying the set of Chunker Rules 108. This conversion can be carried out in many ways, such as by a number of events or a length of time. The Chunker rules 108 apply to all events input to the Chunker 106, not just selected single events. An example of machine flow through the Chunker 106 is shown below.

```
- Chunker --------------------------------
Rule:
  Dt=2 hours
Output:
  11:00:01 Connection time is 10 sec to host node1
  11:10:30 Connection time is 1000 sec to host node1
  11:25:00 Connection time is 8 sec to host node2
  12:25:00 Connection time is 1000 sec to host node1
  12:45:15 Failed login for root on node 5 from IP 17.18.19.20
  12:45:25 Failed login for root on node 5 from IP 17.18.19.20
  12:45:35 Failed login for admin on node 6 from IP 17.18.19.21
  12:45:45 Failed login for admin on node 6 from IP 17.18.19.21
  12:45:55 Failed login for wheel on node 7 from IP 17.18.19.22
  12:46:05 Failed login for wheel on node 7 from IP 17.18.19.22
```

The Chunker 106 uses rules, which are listed under the heading "Rule". In this particular example, the rules used dictate that the only events occurring within a two hour window—beginning at 11:00:01—are output. The 10 events output, which are listed under the leading "Output," show that the rules have been followed. Note that one of the messages above, occurring at 01:02:00 has not been output because it exceeds the 2 hour window. The Chunker 106 helps to divide a large continuous flow of events into smaller manageable groups of events. The output events are then forwarded on to the Grouper 110, as shown in the process flow of FIG. 1.

The Grouper 110 looks for events, or status messages indicating events, that all fall into the the same category. The Grouper 110 groups them together based on these categories, and in one embodiment, makes this determination based upon a substring within the status messages. For example, multiple events that indicate the same network event, e.g., failed login, will be grouped into a single composite event. The Grouper 110 can also group events and determine a single event in the group the meets a certain criteria. For instance, a maximum of minimum value. It should be apparent that there are many different ways of grouping. The specific grouping method can be defined by the set of grouping rules 112 available to the Grouper 110. The following is an exemplary flow through a Grouper 110.

```
- Grouper --------------------------------
Rule:
  * Connection time is __MAX__(?) see to host node $
  * Failed login for $ on node $ from IP $
Output:
  (2) * Connection time is 1000 sec to host node 1
  (1) * Connection time is 8 sec to host node 2
  (2) * Failed login for root on node 5 from IP 17.18.19.20
  (2) * Failed login for admin on node 6 from IP 17.18.19.21
  (2) * Failed login for wheel on node 7 from IP 17.18.19.22
```

The Rules section defines two rules and use symbols that allow the rules to be applied. With reference to the two example rules above, the "*" symbol is a wildcard that will allow accept any event output from the Chunker 106, regardless of the timestamp. Next it looks for the words "Connection time is". Skipping discussion of the field _MAX_(?) briefly, the rule looks for messages that also have the words "see to host node". The "$" indicates that this rule will match all nodes that have the same node number. Going back now to the field "_MAX_(?)," this function determines the maximum value of all of the Chunker outputs meeting the rule's criteria just discussed. As is seen in the Chunker Output section, three messages are for connection time to node 1. As a result of the first Grouper rule, the connection time of 1000 seconds is found, which occurred twice, and is output with a "(2)" indicating the number of multiple occurrences.

The second rule compares all messages with the words "Failed login for", "on node", and "from IP" with the same values for user id, node identifier, and IP address and pares them down to one line with an indicator of the number of occurrences preceding them. After grouping, the next component in the path is the Transformer 114.

The Transformer 114, by utilizing a set of Transformer Rules 116 can transform selected events into different events. This ability allows the system to handle events with specific details that may not be relevant. For example, errors that indicate multiple failed login attempts on different nodes may be transformed into a single event that indicates an attack is in progress (the network is down or overloaded). If the system has events that indicate the network is down, then it can ignore events about being unable to access remotely mounted file systems. This automated system also helps isolate and chase down errors from different sources in multiple job instances of a parallel application or different applications. As another example, an event containing a micro-second timestamp may be made more general by converting the timestamp to perhaps the day on which it occurred rather than the exact microsecond it occurred. The Transformer 114 operates according to one or more Transformer rules 116 to perform the desired transformations. The following is an exemplary flow through a Transformer 114.

```
- Transformer --------------------------------
Rule:
* Connection time is (>500)(?) sec to host node $
       → WARNING host node ?: connection time problems
>1 Failed login for * on node * from IP $ -> Multiple failed login attempts
from remote host ?
Output:
WARNING host node 1: connection time problems
Multiple failed login attempts from remote host 17.18.19.20
Multiple failed login attempts from remote host 17.18.19.21
Multiple failed login attempts from remote host 17.18.19.22
```

In this particular case, the riles supplied to the Transformer search for messages with any time stamp and the words "Connection time is" and "sec to host node". The "$" symbol tells the Transformer to compare all messages meeting these criteria that have the same node number. Once these are all found, the (>500)(?) function filters only those messages that have a connection time greater than 500 seconds. The "→" symbol indicates that once a message meets the criteria, the output will be message the follows.

The second rule is applied only to messages that occur more than one time. They must then have the indicated language. The matching messages have no regard to the user name or node number, but must have matching IP addresses. The output in compliance with the rule is as shown shown in the Output section.

Furthermore, in one embodiment of the present invention, a history of the transformed events is kept in memory. This history can be useful later if the transformed events are ever tracked back to their original state. The flow then moves to the Analyzer 118.

The Analyzer 118 has logical rules 120 that are used to analyze received events. These rules may even combine events. For example, a rule may be "If 'A' and 'B', then 'C'". This means that if event "A" and event "B" are seen, then issue a new event "C" which is fed back into the Analyzer 118 via feedback loop 124, or fed back to any of the upstream logical components, such as to the Filter block 102, as shown in FIG. 1.

The Analyzer Rule expressions are general; that is, no restrictions are placed on the complexity of the rules. The Analyzer 118 will continue to process events until the events are fully transformed. Continuing the example above, the event "C" will be applied to the rule set and if a matching rule is found, that rule will be applied. Assuming such a rule does exist, the event "C" is again transformed to an event "D". This process continues until no transformations occur. Once events have no applicable rules, they are emitted 122 to the user/administrator/auditor to handle as they see fit. The following shows a sample flow through the Analyzer 118.

```
- Analyzer --------------------------------
Rule:
WARNING host node ?: connection time problems
       → Host node ? is down
Multiple failed login attempts from remote host $.$.$.* &&
NOT Host $.$.$.* is down
       → Possible distributed password guessing attempt on class
       C network $.$.$
Output:
Possible distributed password guessing attempt on class C network
17.18.19
```

In this example, the rules dictate if multiple messages are received that contain the same node number along with the words "host node" and "connection time problems", a message will be output that indicates that that node is down. In one embodiment, this message is output and fed back to the Filter block 102 and run through the process at least one additional time Running the output back through the blocks provides several advantages, such as providing a way to compare whether a particular message is output multiple times and allows rules to use the output of the output of the Analyzer 118 to make decisions.

The second rule finds messages indicating the occurrence of multiple failed login attempts from the same remote host. This is indicative of someone attempting to access a system without the proper credentials. However, this could also be indicative of a server being down. For this reason, the rule given in the example ensures that the same hose is not also flagged as being down. If the test is met, the Analyzer 118 outputs a message indicating that there is a possible attempt at password guessing taking place.

In some embodiments of the present invention, the messages coming from the Analyzer can be tagged, or identified, so that it can be determined where the particular message came from and where it's going. Because embodiments of the invention provide feedback loops to upstream components, these identified messages are important in detecting when the messages output from the Analyzer 118 are the same as the messages received by the Analyzer 118. When this matching occurs, it then known that the events cannot be reduced any further without changing the rules applied to one or all of the blocks 102-118. The feedback loop being output from the Analyzer to the upstream logical components is then terminated.

The rules and output provided above are merely examples and the invention is in no way limited to those shown or to the types of rules and outputs. In one embodiment of the present invention, the system includes tools to create rules. The tools are referred to herein as "configuration tools". For example, a tool could show all events, and allow the user/administrator/auditor to create rules based on the event. A tool (or the same tool) could show the other rules and allow the user/administrator/auditor to graphically combine rules, or show the rule interdependencies Embodiments of the present invention also use pre-configured rule sets for each resource. Since the rules used in the system are fairly specific to a resource computing environment, each resource is allowed to ship in and install the logic rules it needs to manage its own events. For example, a web server application may include a specific set of rules to monitor a data flow for certain known attack patterns specific to web server applications.

As time goes by, a set of rules may become out of date. For example, new attack patterns by hackers may not be anticipated by the existing rule set. As the attack pattern is more fully understood by the general community, new rules would be developed to handle these new attack patterns. These new rules could be placed in a known location where the system could fetch and install them to keep the system's rule set current and relevant.

Emitted Events

When an event is emitted to the user/administrator/auditor, it may have been an unchanged event, a group of events (from the actions of the Grouper), or a transformed event. The user/administrator/auditor may need to know, however, the original "raw" event(s) to allow further investigations/actions to be done. Therefore, some embodiments of the present system records, at each step, the actions the system took on events and why. This information is useful and allows detailed reconstructing of the original raw events.

Each of the system elements shown in FIG. 1 can be implemented as separate communicatively coupled units or as one coordinated hardware platform. The components, regardless of the particular implementation, are realized as with a computer system.

Generalized Architecture for a Computer System

Figure 2:
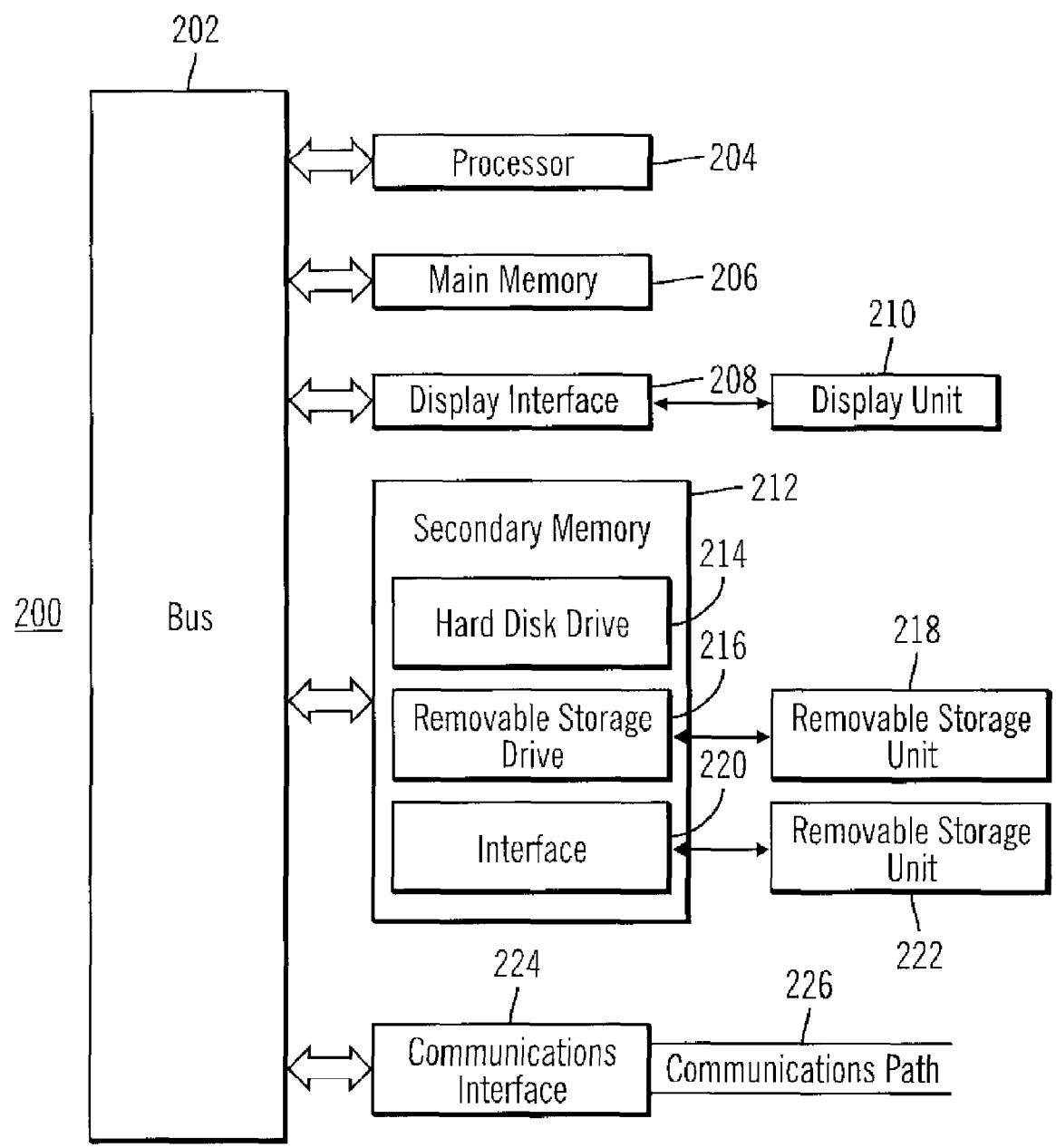
FIG. 2 is a block diagram of a computer system useful for implementing an embodiment of the present invention.

FIG. 2 is a block diagram of a computer system useful for implementing an embodiment of the present invention. The computer system includes one or more processors, such as processor 204. The processor 204 is connected to a communication infrastructure 202 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 208 that forwards graphics, text, and other data from the communication infrastructure 202 (or from a frame buffer not shown) for display on the display unit 210. The computer system also includes a main memory 206, preferably random access memory (RAM), and may also include a secondary memory 212. The secondary secondary memory 212 may include, for example, a hard disk drive 214 and/or a removable storage drive 216, representing a floppy disk drive, a magnetic tape drive, an optical disk drive, etc. Removable storage drive 216, reads and writes to a floppy disk, magnetic tape, optical disk, etc., storing computer software and/or data. The system also includes a resource table 218, for managing resources $R_1$-$R_n$, such as disk drives, disk arrays, tape drives, CPUs, memory, wired and wireless communication interfaces, displays and display interfaces, including all resources shown in FIG. 2, as well as others not shown.

In alternative embodiments, the secondary memory 212 may include other similar means for allowing computer programs or other instructions to be loaded into the computer system. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computer system.

The computer system may also include a communications interface 224. Communications interface 224 acts as both an input and an output and allows software and data to be transferred between the computer system and external devices. Examples of communications interface 224 may include a modem, a network interface (such as an Ethernet card), a communications port, a PCMCIA slot and card, etc. Software and data transferred via communications interface 224 are in the form of signals which may be, for example, electronic, electromagnetic, optical, or other signals capable of being received by communications interface 224. These signals are provided to communications interface 224 via a communications path (i.e., channel) 226. This channel 226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 206 and secondary memory 212, removable storage drive 216, a hard disk installed in hard disk drive 214, and signals. These computer program products are means for providing software to the computer computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information.

Computer programs (also called computer control logic) are stored in main memory 206 and/or secondary memory 212. Computer programs may also be received via communications interface 224. Such computer programs, when executed, enable the computer system to perform the features of the present invention as discussed herein. In particular, the computer programs, when executed, enable the processor 204 to perform the features of the computer system. Accordingly, such computer programs represent controllers of the computer system.

Embodiments of the present invention pare down random events to a defined set of events of interest and perform automatic transformation and correlations. As described above, events in general, and errors specifically, are automatically analyzed and in some cases transformed into more meaningful events based upon the event content. Through feedback loops, raw events are transformed or correlated, then refined by predefined and/or newly generated rules. Events may also be prioritized during the process so that the most important events emerge first as analysis outcomes.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method of performing event analysis, the method comprising:
receiving, by a set of logical components, a set of status messages, wherein a status message indicates a system state and wherein the set of status messages are generated by a set of system state monitoring components;
determining, by at least one logical component in the set of logical components in response to the receiving, that at least two different status messages in the set of status messages are associated with a common category of status message types;
grouping, by at least one logical component in the set of logical components in response to the determining, the at least two different status messages into a single status message;
transforming, by at least one logical component in the set of logical components in response to the grouping, at least the single status message into at least one new status message that comprises at least one new substring of information that fails to be common with the set of status messages, wherein the at least one new status message identifies a new event that fails to be identified by the single status message;
applying, by at least one logical component in the set of logical components, a set of rules to the at least one new status message;
outputting, by at least one logical component in the set of logical components in response to the applying, a set of new status message that comprises a format that substantially resembles a format of status messages generated by the set of system state monitoring components;
inputting the set of new status messages to at least one logical component in the set of logical components that is upstream from the at least one logical component that outputs the set of new status message;
comparing the set of status messages to the set of new status messages; and
terminating the inputting of the set of new status messages to the at least one upstream logical component if the set of status messages match the set of new status messages.

2. The method according to claim 1, further comprising:
performing, prior to the transforming, a filtering function so that at least one of at least two status messages is blocked.

3. The method according to claim 1, wherein the grouping further comprising:
converting, prior to the transforming, at least two status messages into one or more discrete event sets.

4. The method according to claim 1, wherein the grouping further comprises:
grouping, prior to the transforming, each of at least two status messages into one or more categories.

5. The method according to claim 4, wherein each category is a different type of status message received and is based upon a substring within the status messages.

6. A system for performing event analysis, the system comprising:
a plurality of logical components each communicatively coupled to at least one other of the plurality of components, and wherein one or more of the logical components in the plurality of logical components are communicatively coupled to a set of system state monitoring components that generate a plurality of status messages each indicating a system state;
a first logical component in the plurality of logical components that receives from one or more other logical components in the plurality of logical components a set of status messages from the plurality of status messages, and transforms at least one status message in the set of status messages into at least one new status message that comprises at least one new substring of information that fails to be common with the set of status messages;
a second logical component communicatively coupled to the first logical component, wherein the second logical component applies a set of rules to at least one new status message, wherein applying the set of rules to the at least one new status message generates a set of new status messages that identify a new event that is absent from the at least one new status message,
wherein the second logical component outputs the set of new status messages that comprises a format that substantially resembles a format of status messages generated by the set of system state monitoring components, wherein the second logical component outputs the set of new status messages to at least one logical component in the plurality of logical components comprising at least the first logical component that is upstream from the second logical component; and
a third logical component that is upstream from the second logical component that compares the plurality of status messages to the set of new status messages outputted by the second logical component and sends a signal to the second logical component to terminate outputting to the at least one logical component that is upstream from the second logical component if one or more status message in the plurality of status messages match the output.

7. The system according to claim 6, further comprising:
a fourth logical component in the plurality of logical components located upstream from the first logical component; and
a input coupled to the fourth logical component, the input for receiving at least two status messages in the plurality of status messages and performing a filtering function so that at least one of the status messages is blocked.

8. The system according to claim 6, further comprising:
an input on at least one logical component in the plurality of logical components that is located upstream from the first logical component, the input for receiving at least two status messages in the plurality of status messages; and
a processor located in the at least one logical component having the input, the processor for converting the at least two status messages into one or more discrete event sets.

9. The system according to claim 6, further comprising:
an input on at least one logical component in the plurality of logical components that is located upstream from first logical component, the input for receiving at least two status messages in the plurality of status messages; and
a processor located in the at least one logical component having the input, the processor for grouping each of the at least two status messages into one or more categories.

10. The system according to claim 9, wherein each category is a different type of status message received and is based upon a substring within the status messages.

11. A non-transitory computer program storage product, the non-transitory computer program storage product comprising:
a storage medium readable by a processing circuit and storing instructions for execution by the processing circuit for performing a method for performing event analysis, the method comprising:

receiving by a set of logical components, a set of status messages, wherein a status message indicates a system state and wherein the set of status messages are generated by a set of system state monitoring components;

determining, by at least one logical component in the set of logical components in response to the receiving, that at least two different status messages in the set of status messages are associated with a common category of status message types;

grouping, by at least one logical component in the set of logical components in response to the determining, the at least two different status messages into a single status message; transforming, by at least one logical component in the set of logical components in response to the grouping, at least the single status message into at least one new status message that comprises at least one new substring of information that fails to be common with the set of status messages;

applying, by at least one logical component in the set of logical components, a set of rules to the at least one new status message;

outputting, by at least one logical component in the set of logical components in response to the applying, a set of new status message that comprises a format that substantially resembles a format of status messages generated by the set of system state monitoring components;

inputting the set of new status messages to at least one logical component in the set of logical components that is upstream from the at least one logical component that outputs the set of new status message;

comparing the set of status messages to the set of new status messages; and terminating the inputting of the set of new status messages to the at least one upstream logical component if the set of status messages match the set of new status messages.

12. The non-transitory computer program storage product according to claim 11, the method further comprising:

performing, prior to the transforming, a filtering function so that at least one of two status messages is blocked.

13. The non-transitory computer program storage product according to claim 11, wherein the grouping further comprises:

converting, prior to the transforming, at least two status messages into one or more discrete event sets.

14. The non-transitory computer program storage product according to claim 11, wherein the grouping further comprises:

grouping, prior to the transforming, at least two status messages into one or more categories.

* * * * *